United States Patent [19]
Davis et al.

[11] Patent Number: 6,099,660
[45] Date of Patent: Aug. 8, 2000

[54] APPARATUS AND METHOD FOR CLEANING DISCRETE MATERIALS

[75] Inventors: Warren W. Davis, 753 Mallard Cove, Harrodsburg, Ky. 40330; Lynn Dale Damron, Lexington, Ky.; Eugene F. Mooney, 207 Ridgeway Rd., Lexington, Ky. 40502

[73] Assignees: Warren W. Davis, Harrodsburg; Eugene F. Mooney, Lexington, both of Ky.

[21] Appl. No.: 09/226,814

[22] Filed: Jan. 6, 1999

[51] Int. Cl.[7] .................................................... B08B 3/02
[52] U.S. Cl. ............................. 134/21; 68/20; 68/205 R; 134/25.1; 134/26; 134/32; 134/34; 134/68; 134/126; 134/129
[58] Field of Search ............................. 134/21, 25.1, 26, 134/32, 34, 68, 72, 126, 129; 68/20, 205 R

[56] References Cited

U.S. PATENT DOCUMENTS

| | | | |
|---|---|---|---|
| 1,852,144 | 4/1932 | Brogden et al. | |
| 2,015,512 | 9/1935 | Brodgen et al. | 146/202 |
| 2,156,840 | 5/1939 | Davis | 146/194 |
| 2,966,914 | 1/1961 | Sadwith | 134/68 |
| 3,105,504 | 10/1963 | Hirahara | 134/57 |
| 3,240,276 | 3/1966 | Conant et al. | 171/17 |
| 5,387,313 | 2/1995 | Thoms | 134/129 X |
| 5,464,032 | 11/1995 | Litterst | 134/72 |

*Primary Examiner*—Philip R. Coe
*Attorney, Agent, or Firm*—Renner, Kenner, Greive, Bobak, Taylor & Weber

[57] ABSTRACT

Artificial filament is washed, rinsed and dried in a portable apparatus. The filament is fed onto a substantially horizontal conveyor for transportation through a washing cycle. A plurality of oscillating spray nozzles provide a washing solution from over the filament material as it is transported on the conveyor. The washed filaments are distributed to an upward sloping conveyor which directs the filaments between two substantially vertical conveyors belts. The filaments are rinsed while being carried upward between the vertical conveyor belts. The filaments are then transported horizontally on a conveyor belt. Drying nozzles direct air across the filaments to dry the filaments. The dried material is then ejected from the apparatus or redirected to the washing conveyor if it is determined that a second cleaning cycle is required.

6 Claims, 8 Drawing Sheets

APPARATUS AND METHOD FOR CLEANING DISCRETE MATERIALS

TECHNICAL FIELD

This invention relates to an apparatus and method for cleaning discrete materials. More particularly, diverse materials including filamentary, both natural and synthetic, as well as crops, tools, small machine parts and the like can be cleaned, rinsed and dried according to the present invention. Specifically, the apparatus and method is useful for cleaning, rinsing and drying filament fibers of synthetic material which are employed as bedding animals in housing structures and for which purpose the present invention shall be described.

BACKGROUND OF THE INVENTION

Large animals are typically housed in structures in the nature of barns found at various locations such as racetracks, veterinary facilities, horse farms and training centers, dairy farms and zoos. These structures employ bedding material on which the animals walk, eat and sleep. In time, the bedding material becomes saturated with liquid, semi-liquid as well as solid animal waste. Historically, the bedding material was then replaced. While the material, generally straw, wood chips or sawdust, is biodegradable, a hauling and storage problem exists during the disposal of the used bedding material. Current environmental regulations prevent the disposal of this material in conventional landfills, or the stockpiling of such materials in urban areas and particularly in locations where the animal waste could be leached into domestic water sources or supplies.

This requires the disposal companies to locate rural areas where the soiled bedding material can be land spread, or stockpiled. The material can be composted, or baled, and sold to domestic agricultural users or exported to foreign farmers. However, the hauling expense and the loss or degradation in land use attendant such disposal of the soiled bedding is costly.

Synthetic monofilament material is available for use as a bedding material. One such material is offered by Shakespeare Monofilament Corporation. Widespread use of this material has not been forthcoming because the soiled material is not readily cleaned. This material is not biodegradable, but it is reusable. However, a viable and inexpensive apparatus for cleaning the synthetic material has not heretofore been available.

SUMMARY OF THE INVENTION

It is. therefore, a primary object of the present invention to provide an improved apparatus and method for cleaning soiled, synthetic, fibrous or filament materials.

It is another object of the present invention to provide an improved apparatus and method of rejuvenating soiled, synthetic, fibrous material.

It is another object of the present invention to provide an improved apparatus and method of rejuvenating certain forms of soiled, natural, fibrous material.

It is yet another object of this invention to provide an improved apparatus and method to wash, rinse, and dry soiled, synthetic animal bedding material.

It is still another object of the present invention to provide an improved transportable and compact apparatus for washing and rejuvenating soiled, synthetic bedding material in proximity to the location where the synthetic bedding material is used in order to avoid transportation and storage expenses.

It is yet a further object of this invention to provide an improved apparatus having a continuous, automatic conveyor-driven high speed washing/drying process using high water and air pressure at high throughput rates.

It is still a further object of this invention to provide an improved apparatus automatically to wash and dry small lightweight water impermeable objects in a continuous conveyor-driven process at high throughput rates in a mobile unit on site at outdoor locations.

It is yet a still further object of the present invention to provide an improved apparatus to wash, sterilize and dry synthetic animal bedding filament materials by a continuous conveyor-driven process at high throughput rates using extremely high pressure water and air in a mobile unit at outdoor locations.

At least one or more of the foregoing objects, together with the advantages thereof over the known art relating to cleaning soiled filament materials, which shall become apparent from the specification which follows, are accomplished by the invention as hereinafter described and claimed.

A transportable cleaning apparatus embodying the concepts of the present invention may be installed in a trailer-type vehicle which may be, for example, approximately 12 feet in length, 7 feet in height and 5 feet in width. The vehicle has a conventional tongue connection for permitting hook-up to a conventional motor vehicle, such as a pick-up truck. The trailer may also be equipped with stabilizer posts on the four corners thereof which permits the trailer to be maintained in a level attitude during operation.

The apparatus inside the trailer includes an electrical system, fluid pumps and reservoirs, conveyor-drive systems, wash and rinse mechanisms and an air drying system. The electrical system has a control section or programmable logic controller which controls the activation of the conveyor systems, the wash and rinse mechanism including the fluid pumps and the air driers. The source of electrical power for the various systems can be supplied by a portable generator, carried by the transporting vehicle, by an integral generating system, from conventional electric service or, by direct drive from an internal combustion engine.

The conveyor-drive system includes three conveyor belts which are driven by a single electric motor and chain drive. A first of the conveyor belts is substantially horizontal to accept the ingestion of the filament material to be cleaned. The other two conveyor belts have a portion in abutment to transport the filament material in a substantially vertical path therebetween during a rinsing cycle. One of these two belts has a section disposed under a portion of the first belt to accept washed material therefrom and to transport the material to the vertical section. The other of the abutting belts has a substantially horizontal section for transporting the rinsed material under the air dryer before the refurbished material is ejected from the cleaning apparatus.

The wash mechanism has nine nozzles which are connected with the fluid pumps to direct a high pressure washing solution onto the filament material. The nozzles are secured three to a conduit for three conduits, the latter of which are driven in an oscillatory manner to improve the distribution of washing solution and agitate the filament material during the wash process. The conduits are oscillated by an electric motor driven linkage system. However, the method and apparatus for providing the oscillatory movement can include fluid motors or individual electric servo motors at each conduit in lieu of the linkage mechanism.

Each nozzle covers an elliptical spray pattern. Two of the conduits, with three nozzles each, are oscillated in unison while the center conduit with three nozzles is oscillated out of phase. The spray patterns created by this oscillation provides for converging patterns between the outer conduits and the central conduit during two points of the cycle. With this pattern, the bedding material is agitated so that all sides are exposed to the wash solution.

The air drying system has at least one fan which is driven by an electric motor to force ambient or heated air over the rinsed filaments. The air is at an elevated pressure which is produced by the fans. Heated air can be provided by an on-board propane heater or the like. The air flow agitates the filament material to improve the drying process and prevent the filaments from matting.

Since the cleaning apparatus is portable, the machine can be brought to the site of the soiled bedding material for in situ refurbishing. Thus the soiled material need to be transported only from the structure where it is used to the cleaning apparatus which would preferably be stationed immediately adjacent the structure. The stabilizer posts can be adjusted to maintain the cleansing apparatus in a level attitude regardless of the terrain on which the trailer wheels are resting. Moreover, the machine can be manufactured to stand independently where portability is not desired or necessary.

DESCRIPTION OF AN EXEMPLARY EMBODIMENT

Figure 1:
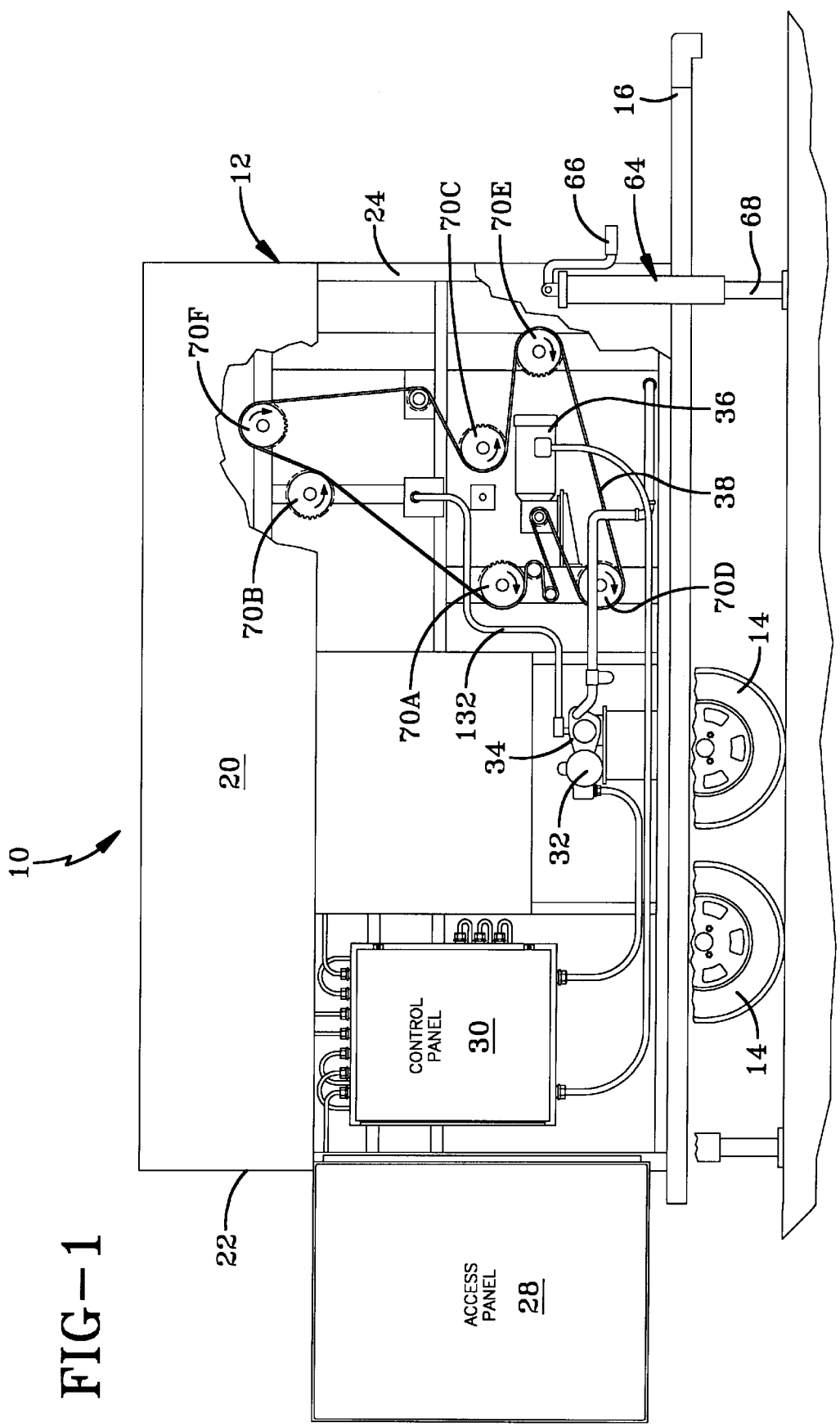
FIG. 1 is a right side elevational view of a vehicle housing the present invention.
Figure 4:
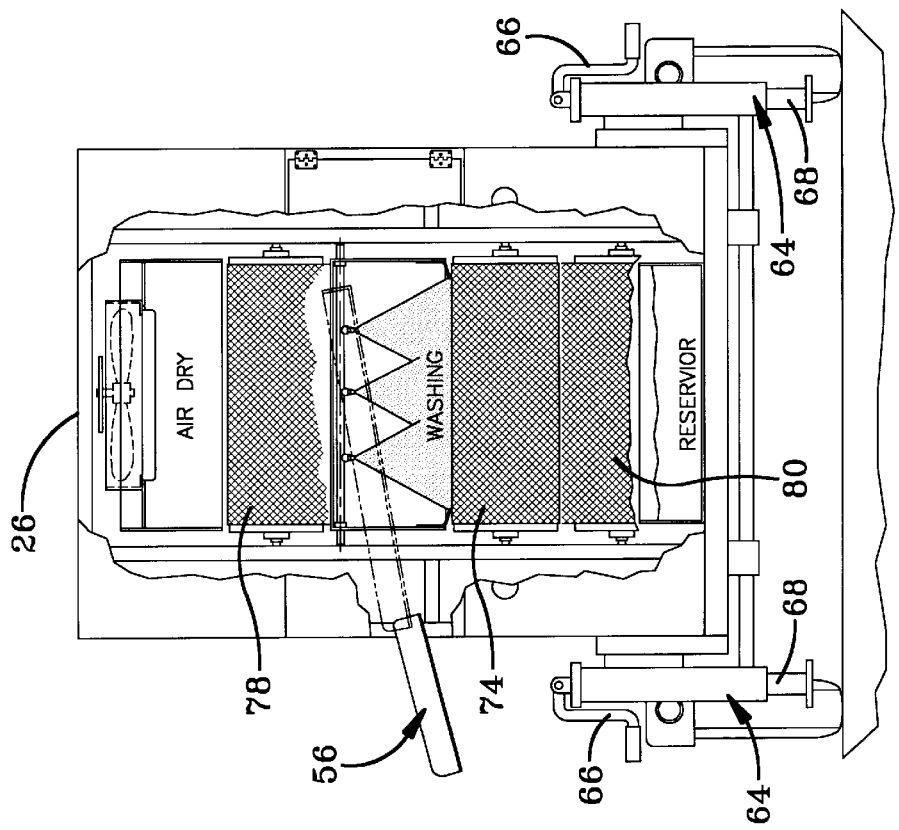
FIG. 4 is a rear elevational view with the rear panel removed.
Figure 3:
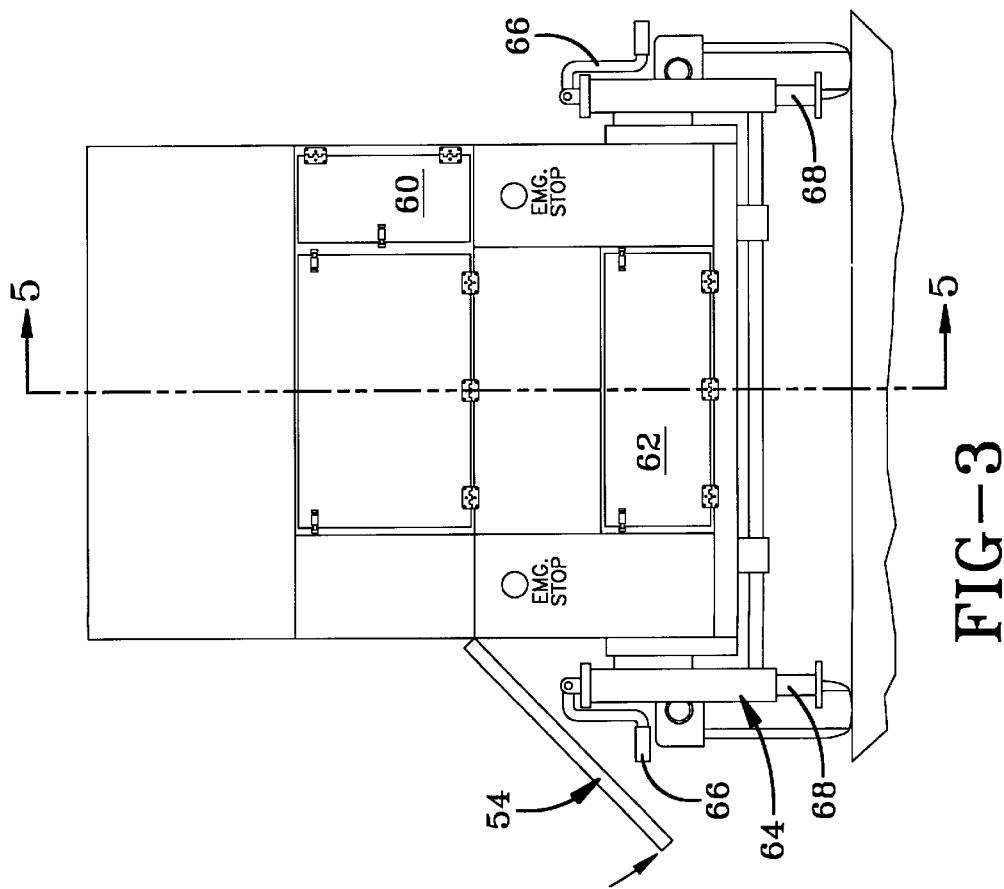
FIG. 3 is a rear elevational view of the vehicle.

Referring to the drawings wherein like characters represent the same or corresponding parts throughout the several views, there is seen in FIG. 1, an apparatus indicated generally by the numeral 10, one representative example or form thereof is as a vehicle, having with a body 12 mounted on wheels 14. The vehicle 10 has a tow bar 16, which will permit attachment to a second vehicle such as a pick-up truck, not shown. The vehicle 10 has side panels 18 and 20 shown in FIGS. 1 and 3, a rear panel 22 shown in FIGS. 3, 4 and 5, a front panel 24, and a top panel 26 shown in FIGS. 4 and 5.

The side panel 20 has door or access ports such as access panel 28 which is opened to allow access to an electrical control panel 30. The electrical control panel houses the electrical mechanisms required to operate the apparatus such as electric motor 32 which drives a rinse pump 34; an electric motor 36 which drives a conveyor chain 38; electric motors 40 each of which drive a respective wash pump 42; an electric motor 44 which drives an oscillating mechanism 46; and electric motors 48 which drive respective fans 50.

The rear panel 22 has a door or feed chute 52 which when opened provides ingress for the bedding material to be washed. The top panel 26 has louvers or openings, not shown, for admitting drying air which may be heated if desired. The side panel 18 has a door 54 which is opened to allow an exit or off-loading chute 56 to be extended. There are further opening panels, such as 58, in the side panel 18 which permit access to various mechanisms, such as the oscillating mechanism 46, so that routine maintenance can be performed Likewise, the rear panel 22 has additional openings 60, 62 which open to allow maintenance.

Figure 2:
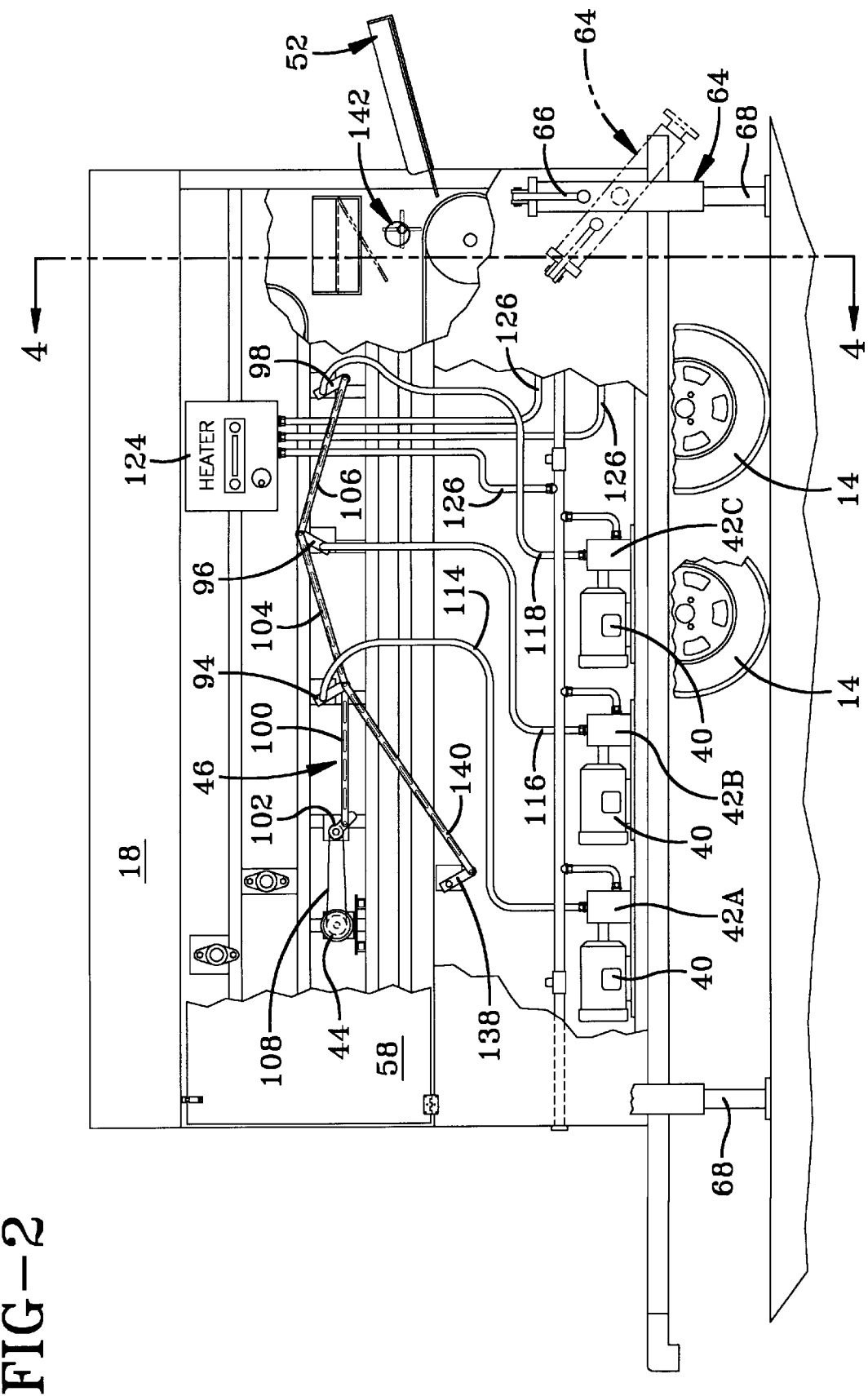
FIG. 2 is a left side elevational view of the vehicle with a side panel partially removed.

The vehicle 10 has four stabilizer mechanisms 64 mounted on the body 12. Each stabilizer 64 has an operating handle 66 which is manipulated to extend a support leg 68. Each stabilizer 64 is pivotally mounted on the body 12 such that they can be rotated into a substantially horizontal position, as shown in FIG. 2, during travel from one location to another. The stabilizers 64 are individually adjustable to allow the vehicle 10 to be maintained in a level position.

The conveyor chain 38 is trained about a plurality of gears 70, each of which drives a roller 72. When discussing the rollers 72 in general the designation 72 will be used, however when a specific roller is referred to, an alpha-numeric designation will be used. This numbering system will be utilized for other components throughout the remainder of this specification. The roller 72A is driven by the gear 70A. A conveyor belt 74 is trained around the rollers 72A and 72B. The rollers 72C and 72D are driven by gears 70B and 70C respectively, and rollers 72F, 72G and 72H are driven by the gears 70D, 70E and 70H respectively. A conveyor belt 78 is trained about the rollers 72C, 72D and 72E and a conveyor belt 80 is trained about the rollers 72F, 72G and 72H.

The conveyor belt 78 has two loops 78A and 78B. The loop 78A is formed by the rollers 72C, 72D and an idler roller 81. The loop 78B is formed by the rollers 72C, 72E and the idler roller 81. The conveyor belt 80 has two loops 80A and 80B. The loop 80A is formed by rollers 72F, 72G and 72D. The loop 80B is formed by the rollers 72G, 72H and 72D. The loop 80A transports the bedding material from the conveyor belt 74 to the loops 80B and 78A which transport the bedding material substantially vertically to the loop 78B. As will be more evident later, the loop 80A is a rinse portion of the cycle and the loop 78B is a drying portion of the cycle. The loops 80B and 78A are sufficiently close, and in contact at the roller 72D as to trap the bedding material therebetween to perform the transfer from loop 80A to 78B.

Figure 5:
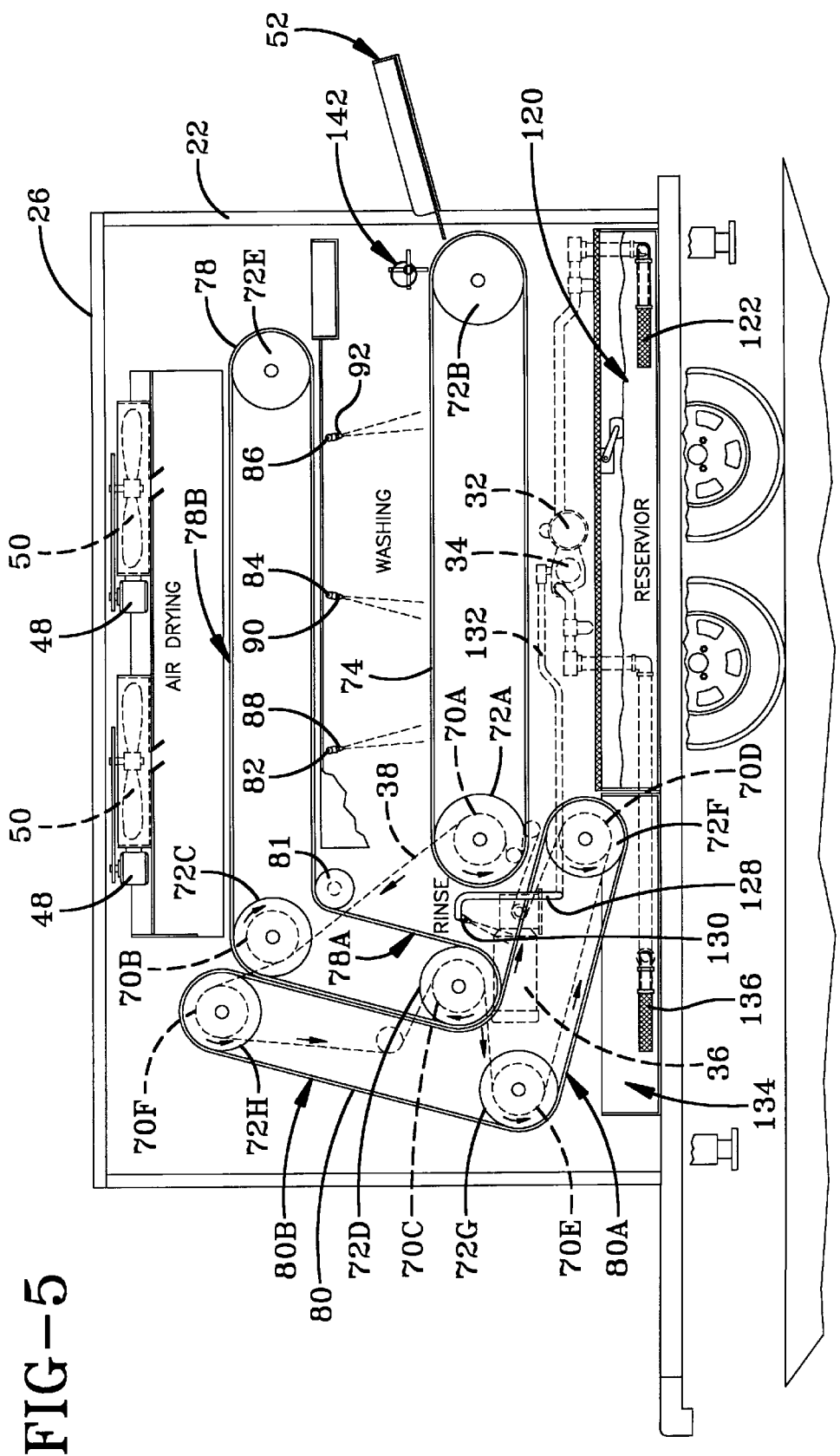
FIG. 5 is an elevational view of the interior of the vehicle displaying the conveyors.
Figure 6:
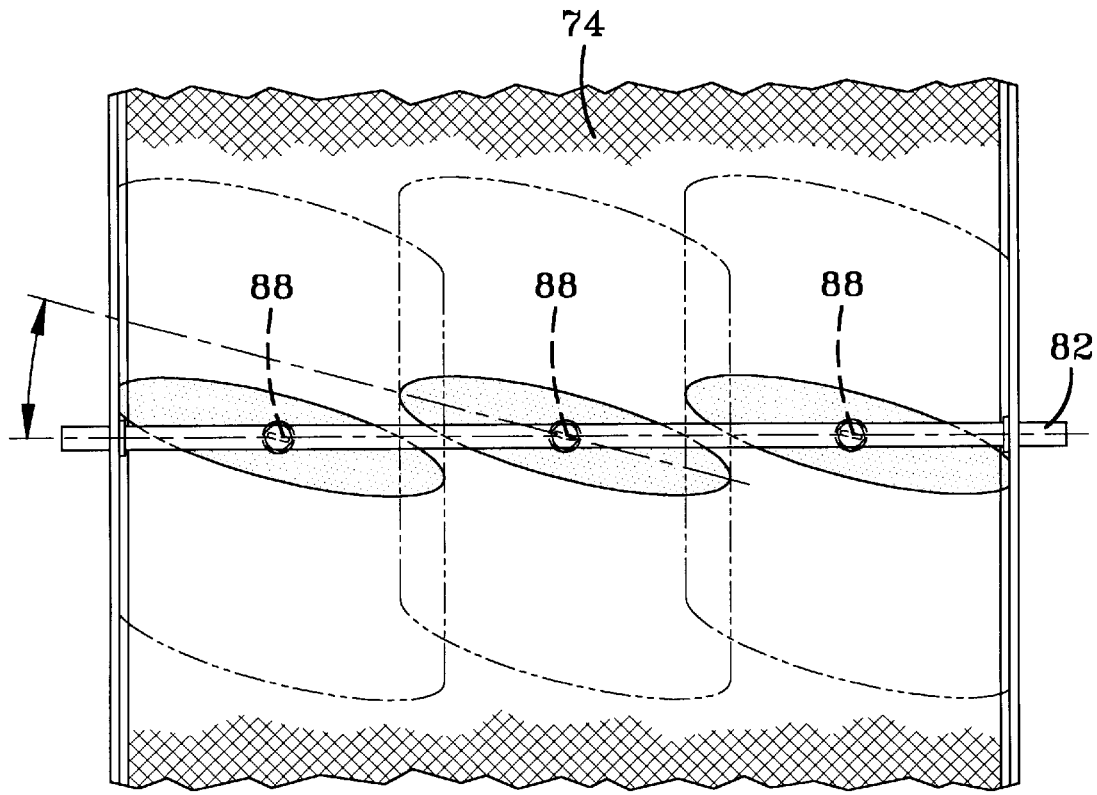
FIG. 6 is a top view of the conduits and spray nozzles of the wash cycle.
Figure 7:
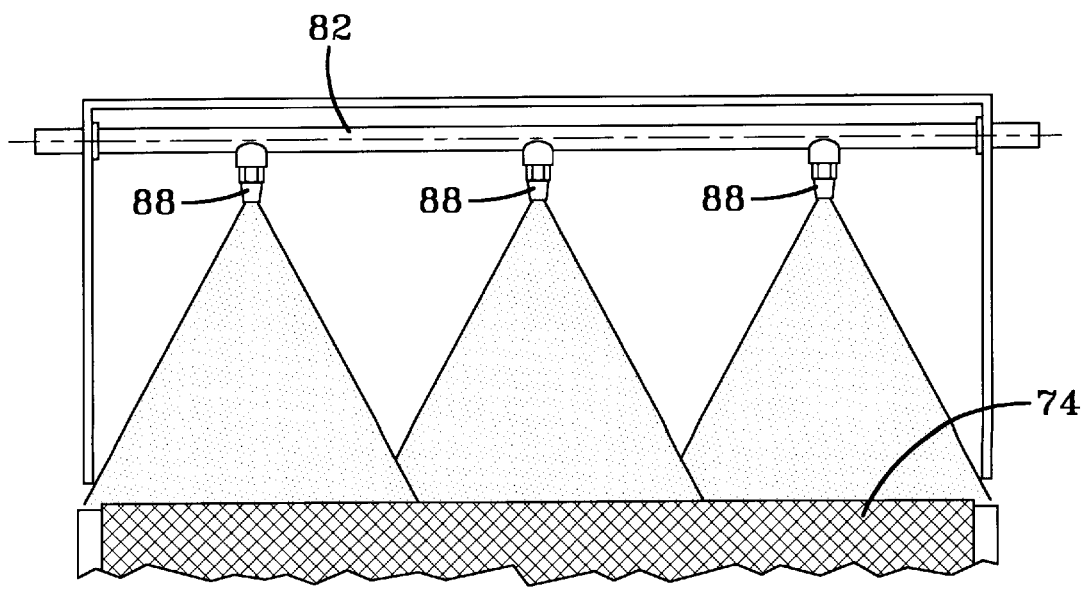
FIG. 7 is a view of the conduits and nozzles taken along line 7—7 in FIG. 6.
Figure 8:
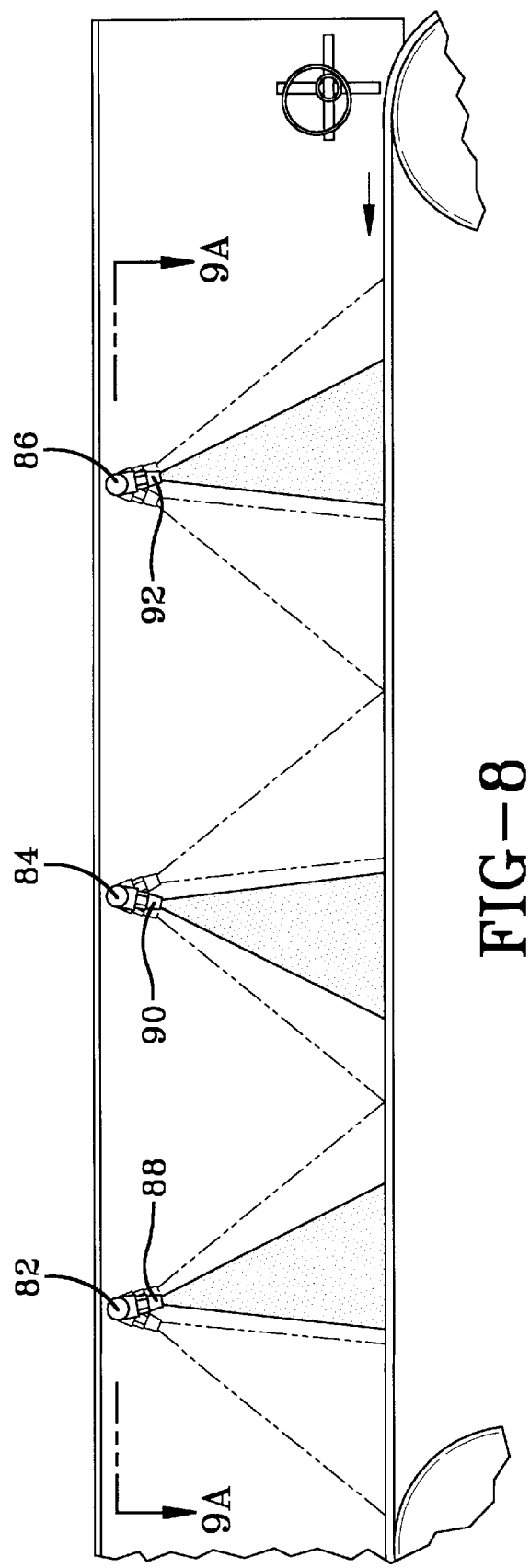
FIG. 8 is a view of the nozzles taken along line 8—8 in FIG. 7.

Three washing conduits 82, 84 and 86 are positioned above the conveyor belt 74. The conduit 82 has three spray nozzles 88, the conduit 84 has three spray nozzles 90 and the conduit 86 has three spray nozzles 92. The spray nozzles 88, 90 and 92 are spaced along their respective conduits as seen in FIGS. 6 and 7, and the conduits 82, 84 and 86 are spaced along the longitudinal axis of the conveyor belt 74 as seen in FIGS. 5 and 8.

The conduits 82, 84, and 86 are oscillated by respective levers or links 94, 96, and 98 which are components in the mechanism 46. The lever 94 is connected by a link arm 100 with a lever 102, and by a link arm 104 with the lever 96. The lever 96 is connected with the lever 98 by a link arm 106. The lever 102 is driven by the motor 44 through a chain 108. The lever 102 and the levers 94, 96 and 98 are sized such that the lever 102 completes a full revolution while the levers 94, 96 and 98 are oscillated through fortyfive degrees. The conduits 82 and 86 are driven in the same direction and are therefore in phase, while the conduit 96 is oscillated one hundred eighty degrees out of phase. This creates a spray pattern shown in FIGS. 9A, 9B and 9C.

Each nozzle 88, 90 and 92 is designed, when stationary, to spray an elliptical pattern which is approximately one third the width of the belt 74. Since the nozzles are oscillated through forty-five degrees (45°), the overall spray pattern of each nozzle is doubled. The pattern of each set of three nozzles covers the entire width of the belt 74. Each nozzle 88, 90 and 92 is set to spray at an angle of fifteen degrees relative to the longitudinal axis of the belt 74. This creates the pattern shown in FIGS. 6, 9A, 9B and 9C.

Figure 9A:
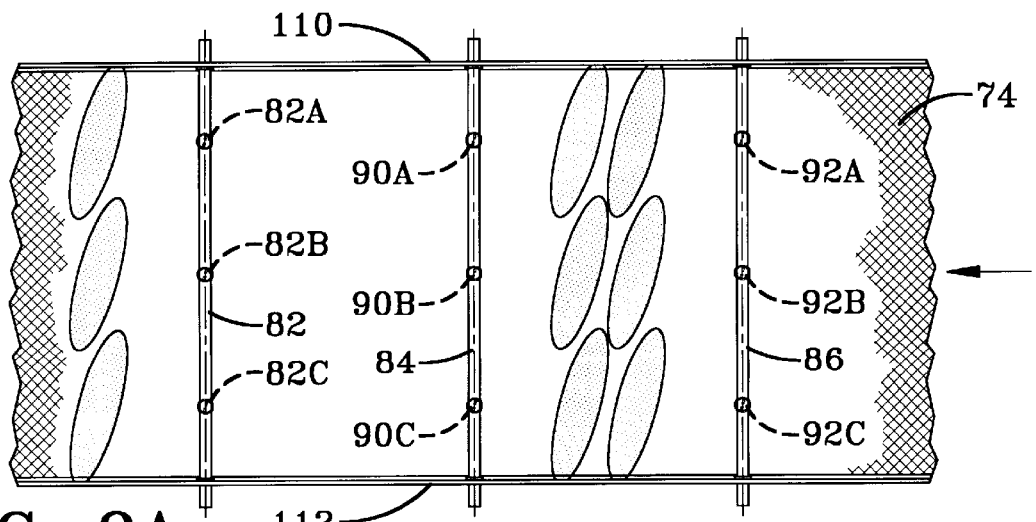
FIGS. 9A, 9B and 9C are diagrammatic representations of the oscillating spray pattern defined in one spray cycle.
Figure 9B:
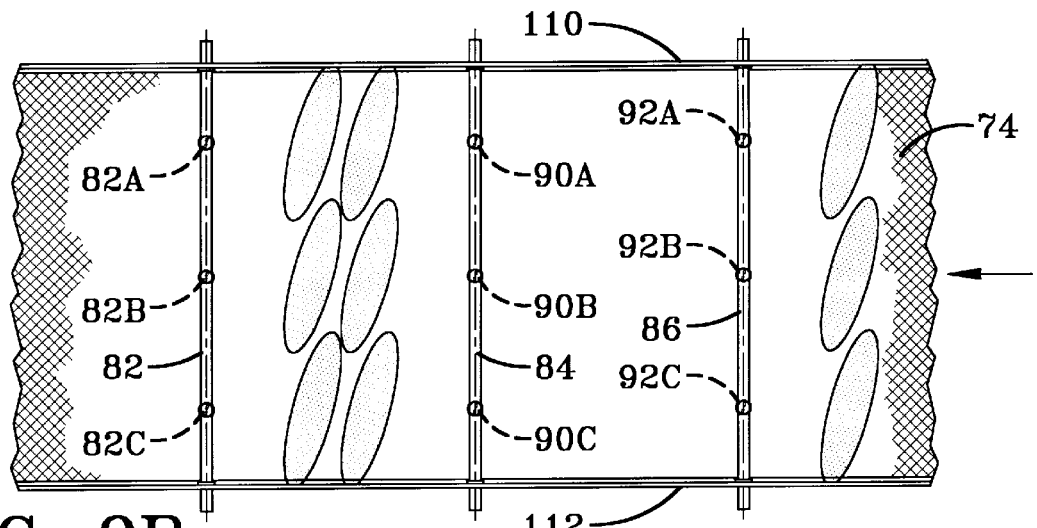
Figure 9C:
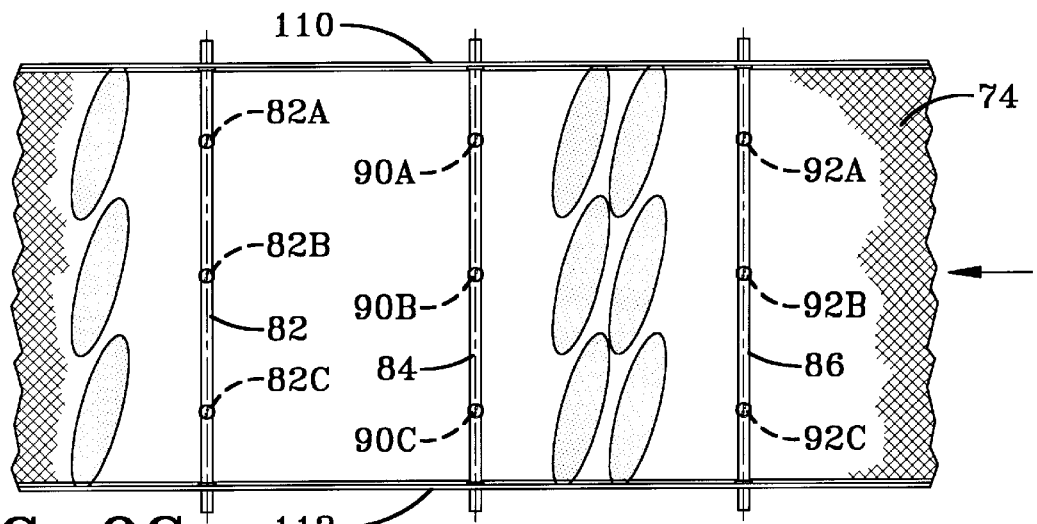

When the conduits are oscillated to the position shown in FIG. 9A, the spray of nozzle 88A extends to or slightly beyond the right edge 110 of the belt 74, the spray of nozzle 92C extends to or slightly beyond the left edge 112 of the belt 74, and the spray of nozzle 90C also extends to or slightly beyond the left edge 112. Due to the offset angle of the nozzles 88, 90 and 92, the spray patterns of the conduits 82, 84, and 86 are parallel As seen in FIGS. 9A and 9C, the spray patterns of the conduits 84 and 86 are converging but do not overlap longitudinally. In FIG. 9B, it is seen that the spray pattern of the conduits 82 and 84 are converging but do not overlap longitudinally. When the spray patterns converge, the bedding material will be agitated and turned such that all sides of the material is exposed to the wash solution being sprayed. This will occur during two points of the wash cycle. Depending on the speed of the conveyor belt, which is variable relative to the spray nozzle oscillation, the agitation will occur many time during the process. It is preferable that the spray patterns do not overlap however, overlapping does not seriously detract from the cleaning cycle but can reduce the efficiency of the agitation achieved when the spray patterns only converge.

A high pressure wash solution is delivered to the conduits 82, 84 and 86 by pumps 42A, 42B and 42C respectively through pipes 114, 116 and 118 respectively. The wash solution is drawn from a reservoir 120 and passes through a filter 122 and a heater 124 via pipes 126 prior to delivery by the pumps 42. The wash solution drains through the conveyor to the reservoir 120 for recycling. The solution is changed periodically depending on the soiled condition of the bedding material.

A rinse conduit 128 (FIG. 5) is disposed in transverse relation to the conveyor belt 80. The conduit 128 has a plurality of nozzles or openings 130. The rinse conduit 128 and nozzles 130 are positioned to bathe the bedding material on the belt 80 with rinse water. The water used in rinsing is not pressurized but merely floods the bedding material. The water is delivered to the conduit 128 from the pump 34 via a pipe 132. The rinse water is taken from a reservoir 134 through a filter 136. The rinse drains from the conveyor belt 80 back to the reservoir 134. The rinse water is also changed periodically depending on the amount of waste material that is rinsed.

The conduit 128 is attached to a lever or link 138 which is connected with the lever 94 through a link arm 140. Thus, the conduit 128 and nozzles 130 are oscillated by the motor 44, lever 102, link arm 100 and link arm 146. The nozzles 130 are not canted relative to the conveyor belt 80 since agitation during rinsing is not necessary.

The fans 50 circulate air over and through the conveyor belt 78. This causes air drying of the bedding material on the conveyor belt 78. The air stream can be unidirectional or oscillating as desired. To cause oscillation, louvers 142 can be caused to swing or vibrate. Also the fans 50 can be pivotally mounted to produce an oscillating air stream. Also if desired, an air heater or radiator can be provided to warm the air prior to entering the fans or upon leaving the fans. It is to be appreciated that at least one fan may be capable of drying and, an on-board propane heated (not shown) may also be provided.

Figure 10:
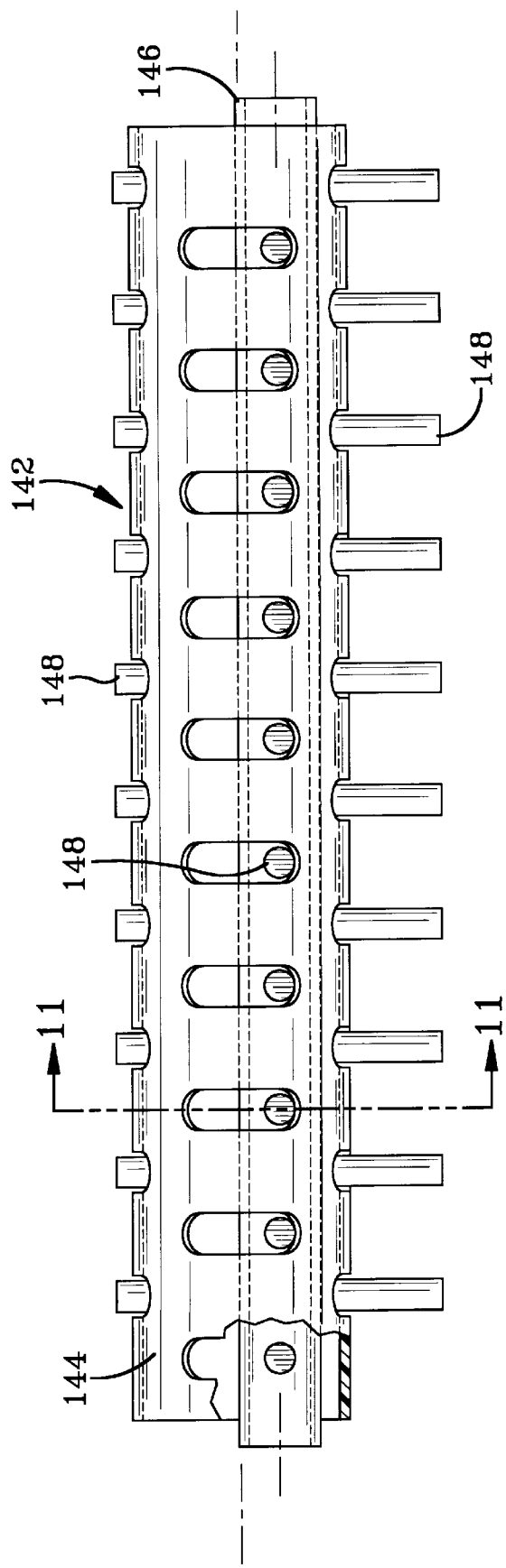
FIG. 10 is a side view of an eccentric axis roller apparatus.
Figure 11:
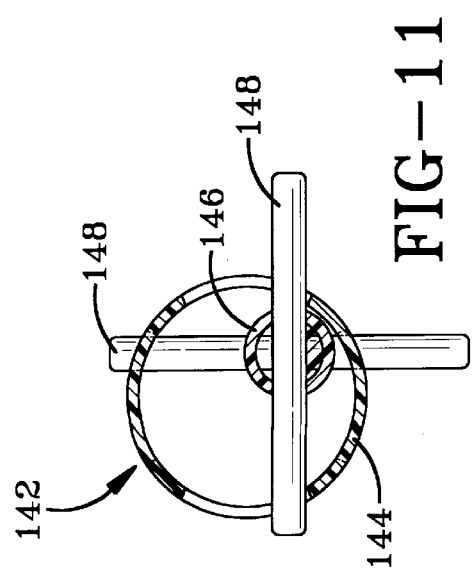
FIG. 11 is a view taken along line 11—11 in FIG. 10.

As depicted in FIGS. 10 and 11, an agitator or eccentric axis roller apparatus 142 is disposed adjacent the feed chute 52 at a position above the conveyor belt 74. The eccentric axis roller 142 has a drive tube 144 surrounding a support rod 146 in which a plurality of fingers 148 are disposed. The drive tube 144 is driven by a motor, not shown, to cause the fingers to agitate the bedding material being admitted at the feed chute 52. The fingers 148 are retracted into the drive tube 144 as it is rotated to release any bedding material inadvertently engaged by or clinging to the fingers 148.

Having thus described the apparatus 10, i.e., the vehicle, the operation thereof shall be described. First, the vehicle 10 is towed to the location or cite at which the bedding material is located. For example, this can be a farm or stable where the bedding material is used. The bedding material can be stored at the location or taken directly from the structure in which the animals are sheltered.

When the vehicle 10 is parked and leveled at a work site, the feed chute 52 is opened, and the wash pumps 42, the rinse pump 34, the fans 50 the conveyor chain 38 and the heater 124 are activated. The synthetic bedding material to be washed is placed on the feed chute for loading and the fingers 148 of the eccentric axis roller push the bedding material onto the conveyor belt 74 in a substantially even layer. The belt 74 carries the material, transporting it under the wash nozzles 92, 90, and 88. As described above, the oscillating action and placement of the nozzles 92, 90, and 88 agitate the bedding material while the nozzles 92, 90, and 88 are oscillated by the mechanism 46.

As the bedding material reaches the roller 72A, it is transported by gravity to the conveyor belt 80 which carries the bedding material under the rinse nozzles 130 where it is flooded with a rinse solution and rinsed. When the bedding material reaches the roller 72D, it is trapped between the conveyor belts 80 and 78 since both of these belts 80 and 78 are trained about the roller 72D. The material is held between the conveyor belts 74 and 80 and is transported substantially vertically to the roller 72C. At this point, the material is transported horizontally on the conveyor belt 78. The material on this belt 78 passes under the drying fans 50 and is dried before being dispensed at the off-loading chute 56.

When the material is ejected from the vehicle 10, it may inspected for cleanliness and then baled, bagged or redistributed to the animal structure from which it was taken. If it is determined that the bedding material needs further cleansing, it is reintroduced into the feed chute 52 for another cleaning cycle. If the material is baled, it can be stored at the site or transported to a storage location to await reuse.

Although the apparatus has been described as a vehicle, it is to be understood that a stationary apparatus will be constructed in substantially the same manner, absent wheels, towing means and attendant frame members. Additionally, portable power such as provided by internal combustion engines, and the optional use of portable heaters, may be eliminated. In large stables, producing continuous collections of used bedding material, the owner may elect to install one or more such apparatus for use on a continuous basis. Thus, practice of the present invention is not to be limited to portable, vehicular forms of apparatus.

It is to be further understood that although the apparatus 10 is useful for the cleaning of soiled, synthetic bedding material, it need not be so limited in usage. Other forms of filament material of a natural material, such as hemp, may also be cleaned. Depending upon the type of filament material employed, as well as its degree of use, those skilled in the art can readily adjust the speed of the conveyors, the temperature, pressure and volume of water and, the drying cycles.

Moreover, while the apparatus 10 has been described in conjunction with the cleaning of soiled bedding material, it is also to be understood that other discrete materials can also be loaded and processed. By way of example, agricultural uses could include the loading and washing of crops, while industrial usage could include the handling of small tools, machine parts and the like.

Thus, it should be evident that the apparatus and method of the present invention are highly effective for washing a variety of discrete i.e., separate, materials. The invention is particularly suited for agricultural uses, but is not necessarily limited thereto.

In the foregoing description, certain terms have been used for brevity, clearness and understanding; but no unnecessary limitations are to be implied therefrom beyond the requirement of the prior art, because such terms are used for descriptive purposes and are intended to be broadly construed. Moreover, the description and illustration of the invention is by way of example, and the scope of the invention is not limited to the exact details shown or described.

Based upon the foregoing disclosure, it should now be apparent that the use of the apparatus and method described herein will carry out the objects set forth hereinabove. It is, therefore, to be understood that any variations evident fall within the scope of the claimed invention and thus, the selection of specific conveying mechanisms, nozzles, pumps, motors, speeds of operation, volumes of water and air and the like can be determined without departing from the spirit of the invention herein disclosed and described. Moreover, as noted hereinabove, other forms of apparatus can be substituted for the apparatus chosen to illustrate practice. Thus, the scope of the invention shall include all modifications and variations that may fall within the scope of the attached claims.

What is claimed is:

1. Apparatus for cleaning bedding material comprising:

means for loading soiled bedding material into said apparatus;

a first conveyor belt for transporting the bedding material under a plurality of conduits each having a plurality of washing nozzles disposed to spray a predetermined pattern;

an oscillating mechanism for cyclically oscillating said conduits to establish an extended predetermined spray pattern over a portion of said first conveyor belt, said oscillating mechanism including means for oscillating adjacent conduits in opposed directions to cause said extended spray pattern of at least two adjacent conduits to be converging during a first portion of the cycle and diverging during a second portion of the cycle.

2. The apparatus defined in claim 1 further comprising:

a second conveyor belt having a first and second loop;

a third conveyor belt having a first and second loop;

said first loop of said second conveyor belt being disposed to receive washed material from said first conveyor belt;

said second loop of said second conveyor belt and said first loop of said third conveyor belt being disposed to cooperatively transport the bedding material substantially vertically; and, said second loop of said third conveyor belt transporting the bedding material to a discharge chute.

3. The apparatus defined in claim 1 further comprising:

a second conveyor belt and a third conveyor belt;

said second conveyor belt transporting the bedding material from said first conveyor belt through a rinse area;

said second conveyor belt and said third conveyor belt cooperating to transport the bedding material to a drying area; and, said third conveyor belt transporting the bedding material through said drying area and distributing the bedding material to an off-loading chute.

4. The apparatus defined in claim 1 further comprising:

means for agitating the bedding material adjacent said loading means and prior to the bedding material being washed.

5. A method of cleaning soiled animal bedding material comprising the steps of:

loading the bedding material to be cleaned onto transporting means;

transporting said material under a plurality of sets of spray nozzles;

oscillating said spray nozzles in a converging and diverging pattern between adjacent sets of spray nozzles to effect agitating of said bedding material during the converging of the pattern;

transporting said bedding material to a rinse area;

rinsing said bedding material;

transporting said rinsed material to a drying area; and, drying said material with a stream of air.

6. A method of cleaning soiled animal bedding material, as set forth in claim 5, including the additional step of agitating the bedding material after said step of loading and prior to said step of washing.

* * * * *